United States Patent
Moul et al.

(10) Patent No.: US 12,172,495 B1
(45) Date of Patent: Dec. 24, 2024

(54) DYNAMIC EVAPORATOR TEMPERATURE TARGET FOR INTERIOR VIEW CLEARING

(71) Applicant: Rivian IP Holdings, LLC, Irvine, CA (US)

(72) Inventors: Zachary Kyle Moul, Redondo Beach, CA (US); Ean Joshua Hall, Long Beach, CA (US); Paulo Lucena Kreppel Paes, Irvine, CA (US); Dewashish Prashad, Irvine, CA (US); Ajay Panekkad, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/540,753

(22) Filed: Dec. 14, 2023

(51) Int. Cl.
*B60H 1/32* (2006.01)
*B60H 1/00* (2006.01)
*B60H 1/22* (2006.01)

(52) U.S. Cl.
CPC ..... *B60H 1/32281* (2019.05); *B60H 1/00642* (2013.01); *B60H 1/00735* (2013.01); *B60H 1/0075* (2013.01); *B60H 1/00785* (2013.01); *B60H 1/00828* (2013.01); *B60H 2001/2253* (2013.01)

(58) Field of Classification Search
CPC ............ B60H 1/32281; B60H 1/00642; B60H 1/00735; B60H 1/0075; B60H 1/00785; B60H 1/00828; B60H 2001/2253
See application file for complete search history.

(56) References Cited

U.S. PATENT DOCUMENTS

| | | | | |
|---|---|---|---|---|
| 6,112,807 A | * | 9/2000 | Dage | B60H 1/3207 236/44 C |
| 2005/0115255 A1 | * | 6/2005 | Wang | B60H 1/00864 236/44 C |

FOREIGN PATENT DOCUMENTS

EP          1112871 A1 *  7/2001   ......... B60H 1/00785

* cited by examiner

*Primary Examiner* — Mohammad Ali
*Assistant Examiner* — Sheela Rao
(74) *Attorney, Agent, or Firm* — BAKERHOSTETLER

(57) ABSTRACT

Methods and systems are provided for managing cabin conditions. A fogging metric can be determined. A control signal is generated based on the fogging metric. The system facilitates modification to the operation control of the at least one climate control device based on the control signal. Such a response can correspond to control of a target evaporator temperature of an HVAC system. The target evaporator temperature can be adjusted within a continuous range of available temperatures. As such, the operation of the evaporator can be adjustably tailored to the needs of addressing a fog factor while also maximizing efficiency of the overall system.

17 Claims, 9 Drawing Sheets

DYNAMIC EVAPORATOR TEMPERATURE TARGET FOR INTERIOR VIEW CLEARING

INTRODUCTION

The present disclosure is directed to dynamic climate control and, more particularly, to detecting and responding to fogging conditions. In the context of electric vehicles, addressing the fog factor in a power efficient manner can help optimize energy usage of the vehicle and ultimately increase the operating range of vehicle's battery.

SUMMARY

In some embodiments, the present disclosure is directed to systems and methods for detecting or estimating fogging conditions. For example, the system may determine an extent or probability of fogging, which may provide an indication of visibility at a windshield or window, based on solar flux, ambient temperature, cabin temperature, air flow rate, relative humidity or dew point temperature, vehicle speed, or a combination thereof.

In some embodiments, the present disclosure is directed to systems and methods for determining a response for, and responding to, fogging conditions. For example, in some embodiments, the system determines the response based on a fogging metric, which may be determined based on available sensor signals. The response can include determining a target evaporator of an HVAC system. By adjusting the target evaporator temperature, the operation of the evaporator can be adjustably tailored to the needs of addressing a fog factor while also maximizing efficiency of the overall system. In particular, the evaporator can be operated at a target temperature that is sufficiently low to address the detected fog factor without expending more energy than is necessary to achieve such a result. For example, at high values of fog factor (e.g., partial or cleared), the evaporator can be operated at a higher target temperature to reduce energy consumption, once it has been determined that lower target temperatures are not necessary for addressing fog accumulation.

In some embodiments, the present disclosure is directed to systems and methods for managing fogging conditions of a vehicle interior with an HVAC system. In some embodiments, the method, as implemented by control circuitry of the system, can include obtaining, by a processor, sensor data from at least one sensor of the vehicle, the sensor data indicating a condition at a windshield of the vehicle; determining, based on the sensor data, a target evaporator temperature from within a continuous range of available evaporator temperatures that are between a minimum target temperature and a maximum target temperature; and transmitting, using control circuitry, a control signal for achieving the target evaporator temperature at the HVAC system of the vehicle.

In some embodiments, the method for managing an HVAC system of a vehicle can include: obtaining, by a processor, sensor data from multiple sensors of the vehicle, the sensor data indicating a condition, a humidity condition, and a light condition at a windshield of the vehicle; calculating, based on the sensor data, a fog factor; if the fog factor is above a maximum threshold, transmitting, using control circuitry, a first control signal for achieving a maximum target temperature at an evaporator of the HVAC system of the vehicle; if the fog factor is below a minimum threshold, transmitting, using the control circuitry, a second control signal for achieving a minimum target temperature at the evaporator; and if the fog factor is between the minimum threshold and the maximum threshold, transmitting, using the control circuitry, a third control signal for achieving an intermediate target temperature at the evaporator of the vehicle.

A semiconductor device for a vehicle can include circuitry configured to: obtain sensor data from at least one sensor of the vehicle, the sensor data indicating a condition at a windshield of the vehicle; calculate, based on the sensor data, a fog factor; determine, based on the fog factor, a target evaporator temperature from within a range of available evaporator temperatures, wherein each of the available evaporator temperatures within the range corresponds to a different value for the fog factor; and transmit a control signal for achieving the target evaporator temperature at an HVAC system of the vehicle.

In some embodiments, determining the fogging metric includes determining a relative humidity corresponding to a windshield of the vehicle, determining a temperature corresponding to the windshield, determining a solar flux corresponding to the windshield, or determining a blower duty cycle, or combinations thereof. In some embodiments, determining the fogging metric is based on a dewpoint temperature corresponding to a windshield, a temperature corresponding to the windshield, and a temperature gradient corresponding to the windshield. For example, the temperature gradient is determined based on a solar flux and a cabin air flow rate. In some embodiments, determining the control signal based on the fogging metric includes classifying the fogging metric based on a predetermined classification scheme. For example, one or more ranges defined by values of the fogging metric may be used to classify the fogging metric. In some embodiments, determining the control signal based on the fogging metric includes determining a response metric based on a functional relationship with the fogging metric. In some embodiments, the operational control includes a target evaporator temperature, a blower duty cycle, a heater temperature, a compressor speed, or an air system duct door position, or combinations thereof.

In some embodiments, the method includes facilitating modification to the operational control at least one climate control device by controlling at least one of a blower, a resistance heater, a compressor, or an actuated duct door, or combinations thereof.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
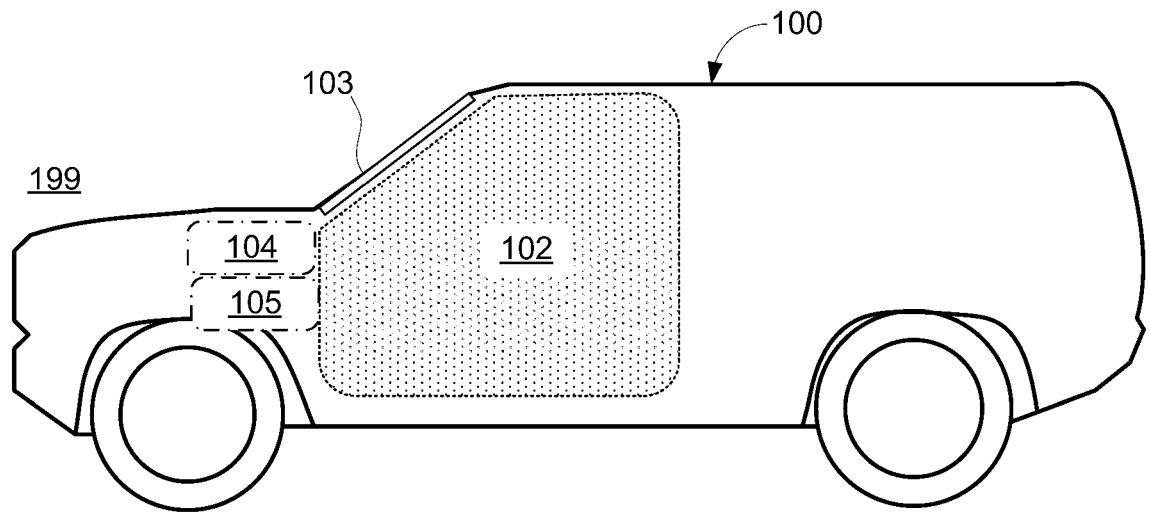
FIG. 1 shows a side view of an illustrative vehicle having a cabin controller in accordance with one or more implements of the present disclosure.

Heating, ventilation, and air conditioning (HVAC) systems may include smarter (e.g., more sensors, adjustability, and/or response), more dynamic, and more integrated vehicle systems, which may be associated with a greater need for accurate estimations and optimal control strategies to efficiently actuate the system towards optimal thermal comfort and ensure cabin view clearing (e.g., defogging). One main challenge is to estimate the highly complex physics that may dictate the system performance, while relying on readily available signals and smoothly actuating system responses over a wide range of conditions. In some circumstances, a system may be configured to use more complex data-driven models, complex lookup tables, additional sensors, or a combination thereof. In some embodiments, the present disclosure is directed to methods and systems for managing view clearing and breath temperature based on available sensors and climate control devices, along with physics-based models.

To illustrate, climate control may subdivided into (i) view clearing control, and (ii) temperature control, and the requested system response may be determined as the maximum output of either control block.

View clearing control, for example, may use distinct ranges of a fogging metric (e.g., a fog factor). A fogging metric, such as a fog factor, can be an indication of severity of windshield fog formation. Such fog formation can be detected by one or more sensors of the vehicle. As such, the fogging metric (e.g., a fog factor) can represent one or more characteristics of the fog that are directly or indirectly detected. Determining a fogging metric may include determining a relative humidity corresponding to a windshield of the vehicle, determining a temperature corresponding to the windshield, determining a solar flux corresponding to the windshield, determining a blower duty cycle, determining any other suitable metric indicative of fogging or visibility, or any combination thereof.

Based on the determined fogging metric (e.g., a fog factor), the systems of the vehicle can be operated to clear the fog from the interior of the windshield to maintain a view there through. The systems and methods described herein can be applied to determine a defogging response based on one or more response functions that smoothly capture mild to aggressive responses.

Temperature control, for example, may implement an energy balance at cabin and/or component levels that dictate the target temperature and volumetric flow rate targets to ensure transient and steady cabin thermal comfort. For example, the cabin temperature feedback and a breath temperature estimation model may be used to ensure stability of the system with minimal dependence on calibration parameters.

In an illustrative example, the present disclosure may be directed to usage of physics-based models that take as input signals from sensors readily available in vehicles. In some embodiments, this approach may improve tradeoffs between reducing cost of additional sensors and maximizing accuracy and efficiency of cabin climate control for comfort and view clearing.

FIG. 1 shows a side view of illustrative vehicle 100 having cabin controller 104 (e.g., for controlling cabin system 105), in accordance with some embodiments of the present disclosure. As illustrated, vehicle 100 includes vehicle interior 102 (also referred to herein as a "cabin") that includes an interior volume of vehicle 100 and may, for example, correspond to an occupant compartment. In some embodiments, the vehicle interior 102 corresponds to a portion of the vehicle interior (e.g., the area around the driver). Vehicle 100 includes cabin controller 104 that is configured to control cabin system 105, which may include a blower, a refrigeration cycle (e.g., having a compressor, evaporator, condenser, and throttle valve), duct doors (e.g., actuatable duct doors), a heater (e.g., an ohmic heater configured to generate heat based on current flow and a resistive element), any other suitable climate control device, or any combination thereof. In an illustrative example, a user may be located in vehicle interior 102 (e.g., in a seat) and may set a desired temperature. Cabin controller 104 may receive the desired temperature and determine a response based on fogging conditions at windshield 103, an estimated temperature (e.g., a breath temperature) in vehicle interior 102, environmental conditions 199 (e.g., temperature, pressure, humidity, precipitation), any other suitable information, or any combination thereof. In response, cabin controller 104 may adjust or otherwise control the blower, refrigeration cycle (e.g., a compressor thereof), duct doors (e.g., via an actuator), a heater (e.g., by controlling current flow), any other suitable climate control device, or any combination thereof.

Figure 2:
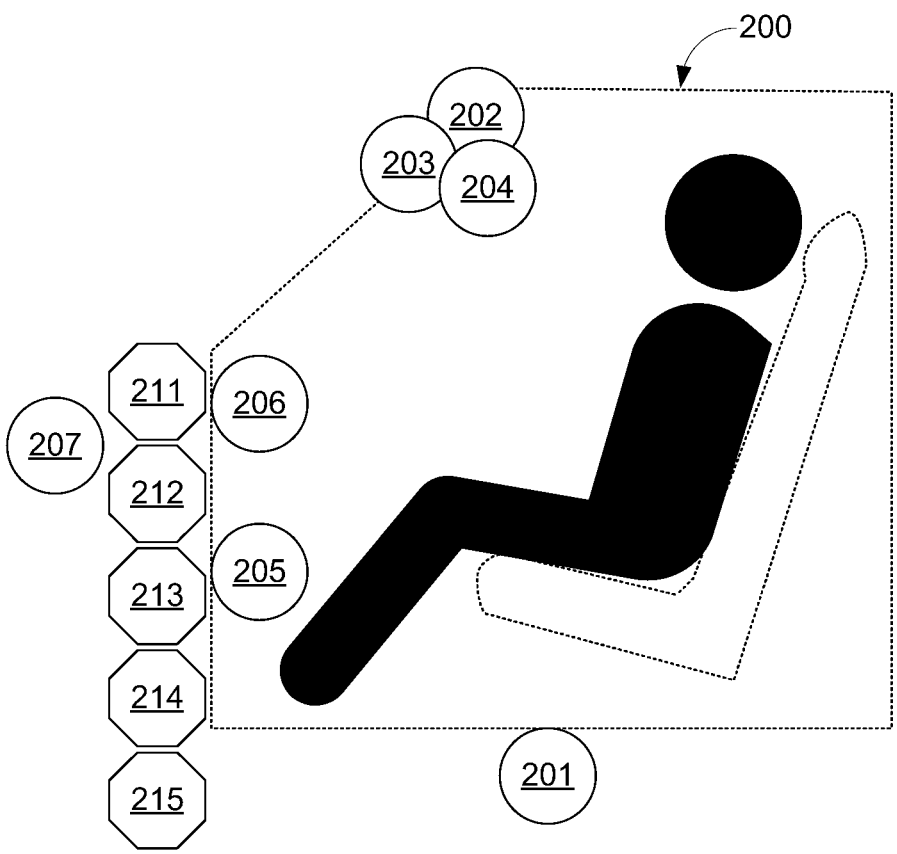
FIG. 2 shows a side view of an illustrative vehicle interior, with corresponding inputs and outputs for the cabin controller of FIG. 1 in accordance with one or more implements of the present disclosure.

FIG. 2 shows a side view of illustrative vehicle interior 200, with corresponding inputs and outputs for cabin controller 104, in accordance with some embodiments of the present disclosure. Vehicle interior 200 may correspond to vehicle interior 102 of vehicle 100 of FIG. 1, for example, and inputs and outputs may correspond to cabin controller 104 and/or cabin system 105 of FIG. 1. As illustrated in FIG. 2, the cabin controller (e.g., cabin controller 104) may be associated with the following inputs and outputs:

Illustrative Inputs 291 (e.g., based on sensor signals or user inputs)
201—Vehicle speed (e.g., as measured by an encoder on a motor shaft and/or drive shaft);
202—Solar Flux (e.g., as measured by an irradiance sensor such as an absorption sensor);
203—Windshield Relative Humidity (e.g., an electrochemical sensor, and/or otherwise a
sensor based on resistance, capacitance, and/or temperature);
204—Windshield Temperature (e.g., a thermocouple, thermistor, RTD, and/or other
sensor);
205—Cabin Temperature (e.g., a thermocouple, thermistor, RTD, and/or other sensor);
206—Setpoint Temperature (e.g., as received at an interface such as a user interface); and 207—other suitable inputs (e.g., evaporator temperature, blower speed, compressor speed, duct door positions as measured and/or sensed).

Illustrative Outputs 292 (e.g., operational controls)

211—Cabin Flow Rate (e.g., as adjusted by a speed of a blower motor);

212—Discharge Temperature (e.g., leaving the cabin system 105);

213—Compressor Speed (e.g., of a refrigeration cycle for AC and defrosting);

214—HVAC Door Positions (e.g., doors that may be actuated to adjust openings); and 215—PTC heater current (e.g., to achieve a target heating rate).

In an illustrative example, cabin controller 104 may take as input any or all of illustrative inputs 291, determine a response based on the input, and then cause one or more climate control devices to achieve the desired output at least partially (e.g., the climate control device might reach a target value or otherwise may tend towards the target value based on characteristics of the system). In some embodiments, cabin controller 104 may detect fogging conditions, detect temperature conditions, or both, and then determine a response based on the fogging conditions, temperature conditions, or a combination thereof.

Figure 3:
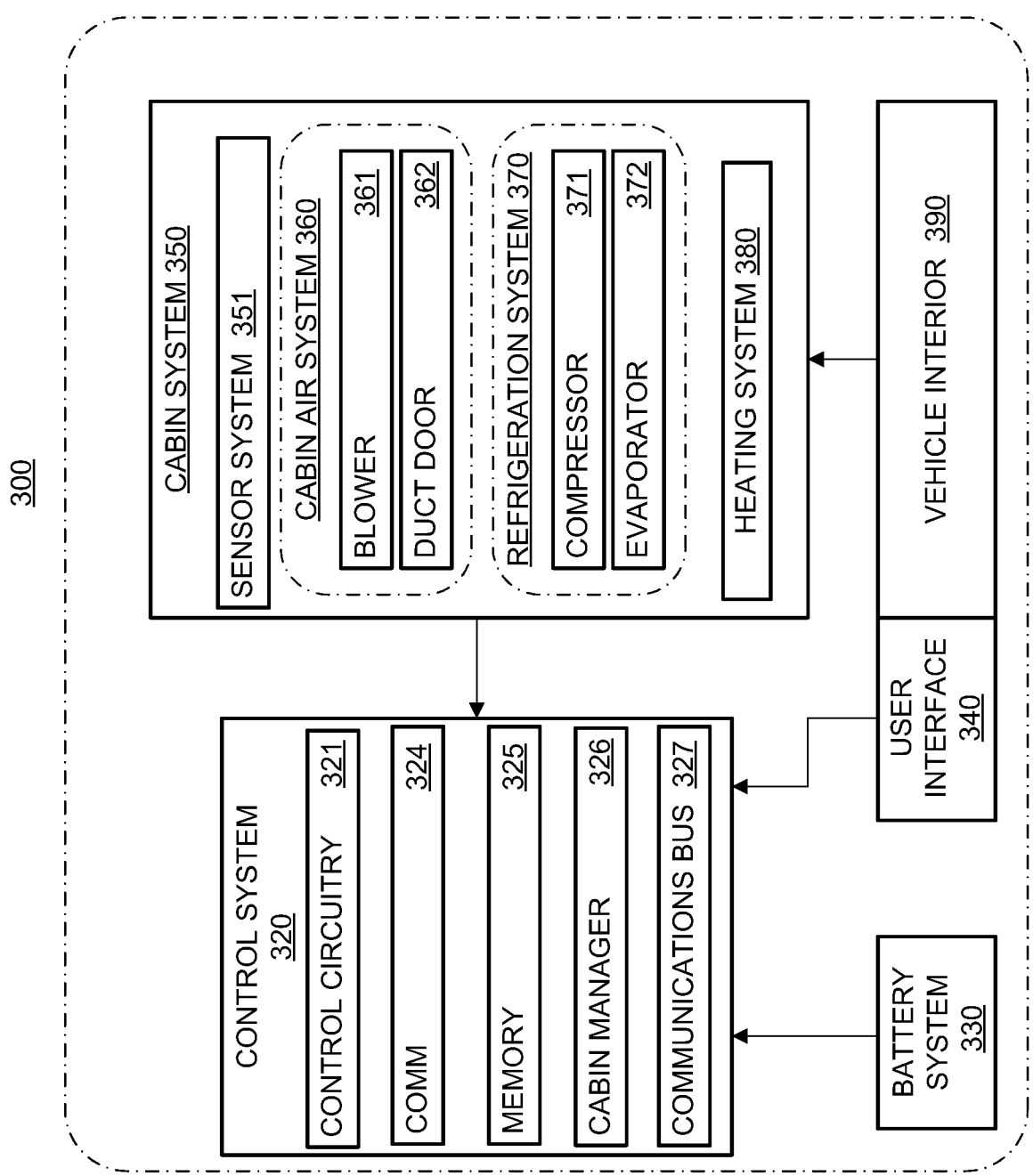
FIG. 3 shows a block diagram of an illustrative system for managing cabin conditions of a vehicle in accordance with one or more implements of the present disclosure.

FIG. 3 shows a block diagram of illustrative system 300 for managing cabin conditions of a vehicle, in accordance with some embodiments of the present disclosure. As illustrated, system 300 (e.g., which may be included in vehicle 100 of FIG. 1) includes control system 320 (e.g., the same as cabin controller 104 of FIG. 1), user interface 340, battery system 330, cabin system 350 (e.g., similar to or the same as cabin system 105 of FIG. 1), and vehicle interior 390 (e.g., the same as vehicle interior 200 of FIG. 1, or vehicle interior 102 of FIG. 1).

Control system 320, as illustrated, includes control circuitry 321 (e.g., as implemented by one or more electronic control units or ECUs), communications interface 324 (comm 324), memory 325 (e.g., configured to store computer instructions), communications bus 327, and optionally cabin manager 326. Control circuitry 321 may include a processor, a communications bus (e.g., in addition to or instead of communications bus 327), memory (e.g., in addition to or instead of memory 325), power management circuitry, a power supply, any suitable components, or any combination thereof. Memory 325 may include solid state memory, a hard disk, removable media, any other suitable memory hardware, or any combination thereof. In some embodiments, memory 325 is non-transitory computer readable media configured to store computer instructions that, when executed, perform at least some steps of any of processes 400, 500, 600, 700, 800, 900, or 1000 described in the context of FIGS. 4-10. In some embodiments, instructions are preprogrammed into memory 325, memory of one or more ECUs, or a combination thereof, for managing cabin system 350 or aspects thereof, determining vehicle information (e.g., including vehicle operating information), determining or receiving status updates, receiving and processing input from a user, or a combination thereof (e.g., as performed by cabin manager 326). In some embodiments, the instructions are loaded or otherwise provided to control circuitry 321 to manage cabin system 350, determine a fogging metric, determine a breath temperature metric, determine a response, generate a control signal, or a combination thereof. To illustrate, cabin manager 326 may be implemented by control circuitry 321, operate separately but in communication with control circuitry 321 (e.g., via communications bus 327), or a combination thereof.

Control system 320 may include an antenna and other control circuitry, or any combination thereof, and may be configured to access the internet, a local area network, a wide area network, a Bluetooth-enable device, an NFC-enabled device, any other suitable device using any suitable protocol, or any combination thereof. In some embodiments, control system 320 includes or otherwise is coupled to user interface 340, which may include, for example, a screen, a touchscreen, a touch pad, a keypad, one or more hard buttons, one or more soft buttons, a microphone, a speaker, any other suitable components, or any combination thereof. For example, in some embodiments, user interface 340 includes all or part of a dashboard, including displays, dials and gauges (e.g., actual or displayed), soft buttons, indicators, lighting, and other suitable features. In a further example, user interface 340 may include one or more hard buttons arranged at the exterior of the vehicle, interior of the vehicle (e.g., at the dash console), or at a dedicated keypad arranged at any suitable position. In a further example, user interface 340 may be configured to receive input from a user device (e.g., a smartphone), haptic input from a user, or both.

Comm 324 may include one or more ports, connectors, input/output (I/O) terminals, cables, wires, a printed circuit board, control circuitry, any other suitable components for communicating with other units, devices, or components, or any combination thereof. In some embodiments, control system 320 (e.g., ECUs thereof) is configured to control a drivetrain (e.g., control an engine, electric motor, transmission, brake), cooling system, cabin system, braking system, autonomous control system, steering system, suspension system, control or manage battery system 330, determine or receive information, communicate with other units, perform any other suitable actions, or any combination thereof. In some embodiments, comm 324, user interface 340, or both, may be configured to send and receive wireless information between control system 320 and external devices such as, for example, a remote system (e.g., a server, a Wi-Fi access point), a vehicle charger, a user device (e.g., a user device such as a smart phone), key fobs, any other suitable devices, or any combination thereof. In some embodiments, communications bus 327 is integrated with comm 324 (e.g., communicatively coupling ECUs, and user interface 340). In some embodiments, communications bus 327 may be coupled to comm 324.

Battery system 330 may include, for example, a vehicle battery pack that may include a plurality of battery cells. For example, battery system 330 may include battery cells, busbars, current collectors, enclosures, DC bus cables or otherwise conductors, contactors, switches, sensors and instrumentation, any other suitable components, or any combination thereof.

As illustrated, cabin system 350, which may be the same as cabin system 105, includes sensor system 351 (e.g., including one or more sensors and/or a sensor interface) and climate control devices such as cabin air system 360, refrigeration system 370, and heating system 380. Cabin air system 360 is configured to pressurize and direct air flow to the cabin (i.e., vehicle interior 390) and includes blower 361 and one or more duct doors 362. Blower 361 may include an electric motor and a fan and may be configured to cause air to flow through cabin air system 360, directed by one or more duct doors 362 to regions of the cabin, dash, floor, windshield, console, or a combination thereof. For example, control system 320 (e.g., control circuitry 321 or cabin manager 326 thereof) may generate control signals for controlling a motor of blower 361 (e.g., controlling a motor speed, current, PWM duty cycle, or other suitable parameter), a position of one or more duct doors 362 (e.g., controlling an actuator position, current, or voltage), any other suitable device, or any combination thereof. In a further example, one or more duct doors 362 may be configured to direct or restrict air flow through evaporator 372 of refrigeration system 370 to cool air, dry the air, or both based on the control signal. Refrigeration system 370 may include a compressor (e.g., compressor 371 including an electric motor and compressor assembly), a condenser, evaporator (e.g., evaporator 372), and a throttle valve, along with any other suitable components, sensors, and plumbing. Refrigeration system 370 may be configured to operate using a refrigerant as a working fluid to achieve sub-ambient temperatures for cooling and/or drying air provided by blower 361. Heating system 380 may include one or more ohmic heaters or other suitable heating devices (e.g., heat recovery devices including heat exchangers) for transferring heat to air provided by cabin air system 360. For example, refrigeration system 370 and heating system 380 may be used to provide air at temperatures above or below ambient temperatures (e.g., and at suitable flow rates and heating/cooling rates to provide defogging, comfort, or both).

In an illustrative example, control system 320 may include cabin manager 326, which may include one or more ECUs used to control operation of cabin system 350. Cabin manager 326 may be associated with control circuitry of a particular ECU of control circuitry 321, distributed among ECUs of control circuitry 321 (e.g., connected by communications bus 327), a separate controller, any other suitable control circuitry, or any combination thereof. In some embodiments, cabin manager 326 may be configured to generate control signals, receive sensor signals, implement and update an algorithm (e.g., manage a state machine, state-flow system, logic instructions, or other suitable algorithm or combination thereof), update setpoints or targets, measure or determine vehicle operating information (e.g., measured or estimated temperatures, heat transfer, humidity psychometrics, or any other suitable information), receive information (e.g., from a remote system), retrieve reference information, determine a response, perform any other operation, or any combination thereof. In some embodiments, cabin manager 326, memory 325, or both, are configured to store information for managing view clearing and cabin comfort. In some embodiments, cabin manager 326 is configured to generate a display at user interface 340 to show the occupant available adjustments, system performance, current conditions (e.g., temperature, fogging metric), target conditions, reference values (e.g., predetermined limits, saturations, or thresholds), any other suitable information, or any combination thereof. In an illustrative example, suitable components of cabin system 350 may be configured to operate based on respective setpoints, and control circuitry 321, cabin manager 326, or a combination thereof is configured to modify the setpoints to manage view clearing and comfort.

In some embodiments, cabin system 350 is configured to provide occupant comfort, interior environment control, or otherwise affect cabin air conditions. In an illustrative example, a cabin air system 360, control circuitry 321, cabin manager 326, or a combination thereof are configured to modify or cease modifying at least one cabin air setting such as air-conditioning setpoint (e.g., based on compressor speed), blower fan setpoint (e.g., a speed of a blower motor), heating temperature setpoint (e.g., as achieved by controlling current flow across a resistive element), total heating or cooling rate, duration of heating or cooling, or a combination thereof. In some embodiments, for example, control circuitry 321, cabin manager 326, or a combination thereof is configured to increase or decrease an AC setpoint for a desired comfort level, turn seat heating and cooling ON or OFF, enable automatic defogging or defrosting, adjust air flow rate, adjust air discharge temperature, or otherwise affect cabin conditions in vehicle interior 390.

FIGS. 4-10 are flowcharts illustrating processes 400-1000, which may be performed by system 300 (e.g., control system 320 thereof). For example, computer-readable instructions for implementing processes 400-1000 may be stored in memory 325 and may be implemented by control circuitry 321, cabin manager 326, or a combination thereof.

Figure 4:
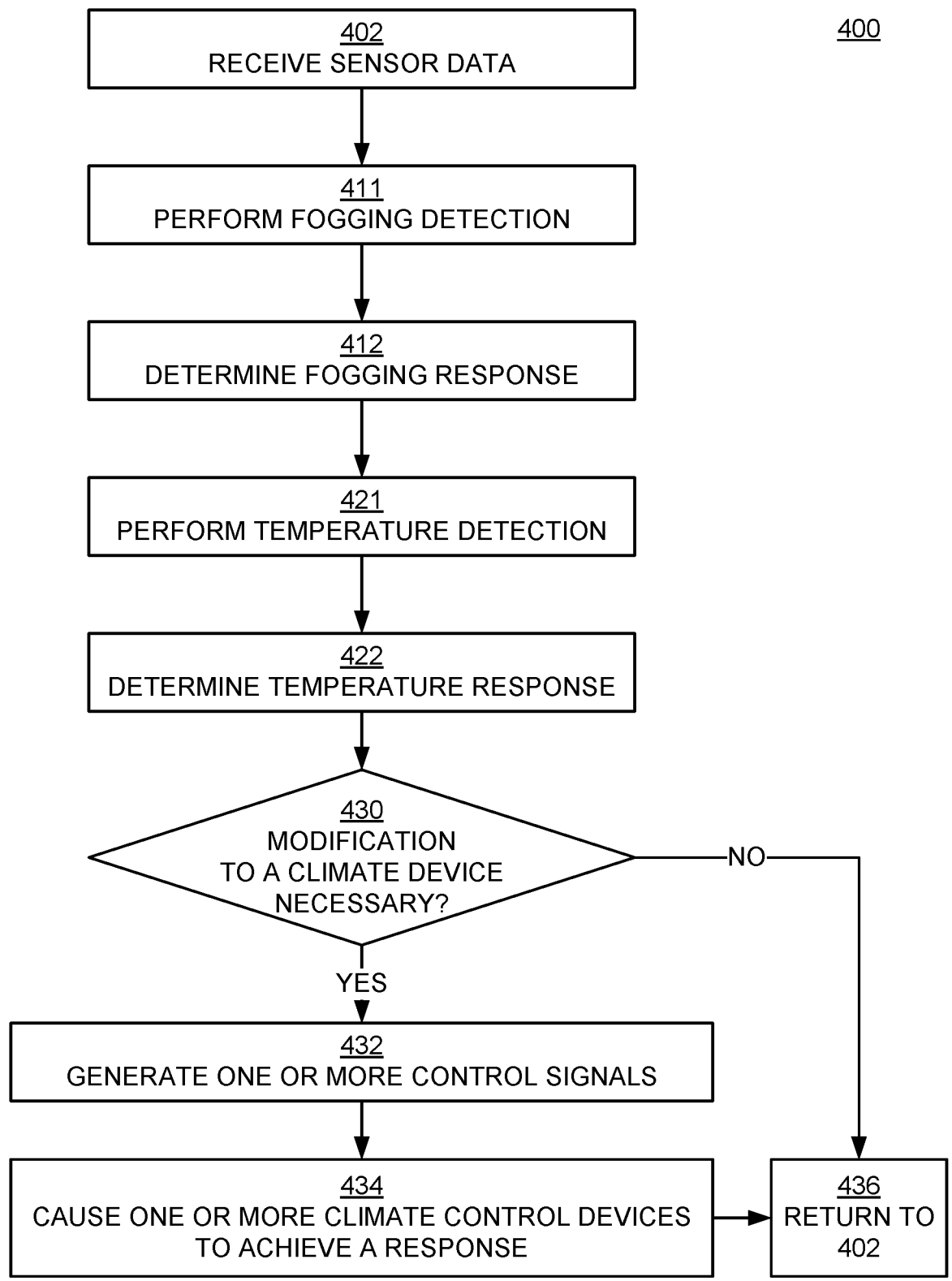
FIG. 4 is a flowchart of an illustrative process for managing cabin conditions in accordance with one or more implements of the present disclosure.

FIG. 4 is a flowchart of illustrative process 400 for managing cabin conditions, in accordance with some embodiments of the present disclosure.

Step 402 includes receiving sensor data as one or more inputs. In some embodiments, inputs can include sensor data that indicates vehicle speed, solar flux, relative humidity, windshield temperature, cabin temperature, discharge temperature, evaporator temperature, user set temperature, any other suitable input (e.g., retrieved, measured or otherwise determined), or any combination thereof. In some embodiments, step 402 includes receiving the sensor data from sensors. For example, the sensors may include a plurality of sensors such as at least one temperature sensor, at least one relative humidity sensor, a solar flux sensor, a vehicle speed sensor, any other suitable sensor, or any combination thereof. In some embodiments, as illustrated, step 402 may include receiving user input at a suitable interface (e.g., user interface 340 of FIG. 3). For example, the user input may include a selection of a knob, hard button, soft button, selectable icon or feature of a touchscreen, a menu item, any other suitable input or selection, or any combination thereof. In some embodiments, reference information may be provided, retrieved from, or otherwise input to step 402. For example, the reference information may include preference information, maximum or minimum limits, thresholds, hierarchies, component information and capacities, predetermined setpoints, algorithm information, parameter values, any other suitable information, or any combination thereof.

The process 400 can include managing view clearing. In some embodiments, managing view clearing may include performing fogging detection at step 411. For example, the system can calculate a fogging metric, such as a fog factor (e.g., based on available sensor signals and physics-based models). Further details regarding exemplary implementations of step 411 are found in the description of process 500 of FIG. 5.

In some embodiments, managing view clearing can further include determining a fogging response at step 412. For example, the system can determine a response based on the fogging metric determined in step 411 (e.g., to achieve some target or goal). Further details regarding exemplary implementations of step 412 are found in the descriptions of process 600 of FIG. 6 and process 700 of FIG. 7.

The process 400 can further include managing cabin temperature, such as a breath temperature. In some embodiments, managing the cabin temperature may include performing temperature detection at step 421. For example, the system may calculate a temperature metric, such as breath temperature (e.g., based on available sensor signals and physics-based models). Further details regarding exemplary implementations of step 421 are found in the description of process 800 of FIG. 8.

In some embodiments, managing cabin temperature can further include determining a temperature response at step 422. For example, the system may determine a response based on the temperature metric determined in step 421 (e.g., to achieve some target or goal). Further details regarding exemplary implementations of step 422 are found in the description of process 900 of FIG. 9.

Step 430 includes determining whether modification to a climate control device is necessary. For example, the system may determine whether the modification to the climate control device is necessary based the results of steps 412 and/or 422. In some embodiments, the system determines whether a modification is necessary based on the fogging response, breath temperature response, or a composite response of steps 412 and/or 422. For example, if the determined response is greater than a threshold or otherwise outside of an operating range, then the system may determine that the modification is necessary. In a further example, if the response includes an adjustment in an operational control (e.g., a shaft speed, duct setting, temperature setting, valve position), or an adjustment in an operating characteristic (e.g., a measured temperature, pressure, humidity, or occupancy), then the system may determine that the modification is necessary. If the system determines the modification is necessary, the system may proceed to step 432. If the system determines the modification is not necessary (or not necessary yet), the system may exit process 400, return to step 402, or otherwise continue to monitor cabin conditions to determine if a modification becomes necessary.

Step 432 includes generating one or more control signals to modify an operational control of at least one climate control device associated with the vehicle. Step 432 can include determining one or more outputs, such as cabin air flow rate (e.g., a blower speed), discharge temperature, compressor speed (e.g., of a refrigeration cycle), an evaporator temperature, one or more door positions (e.g., to direct cabin air), a heater current or power, any other suitable input (e.g., retrieved, measured or otherwise determined), or any combination thereof. For example, at step 430 the system may determine a target blower duty cycle, target blower speed, target airflow, target discharge temperature, target evaporator temperature, target cooling rate, target compressor speed, target heater temperature, target heater heating rate, target duct door positions, any other suitable outputs, any changes in output thereof, or any combination thereof. In some embodiments, at step 430, the system may receive outputs from steps 412 and 422, and then determine an output based on received values. For example, the system may determine a maximum or most extreme output from among steps 412 and 422 and select that output. By further example, the system may generate control signals based on the determined outputs. By further example, the control signals can be generated based on a fogging metric and/or a breath temperature metric.

Step 434 includes causing one or more climate control devices to achieve a response, by modifying an operational control. The control signals generated at step 432 cause the one or more climate control devices to achieve or partially achieve the target response. For example, control signals of step 432 may cause the one or more climate control devices to achieve a target blower speed, a target compressor speed, a target airflow rate, a target discharge temperature, a target heating rate, a target cooling rate, changes thereof, or any combination thereof.

Step 436 includes returning to step 402. In some embodiments, the process 400 can be continuously performed so that the cabin conditions can be continuously managed. In some embodiments, the process 400 can include continually monitoring and determining whether to provide a response or no response. In some embodiments, the process 400 can cease upon achievement of a target condition. Additionally or alternatively, the process 400 can proceed to another step and/or another process.

Figure 5:
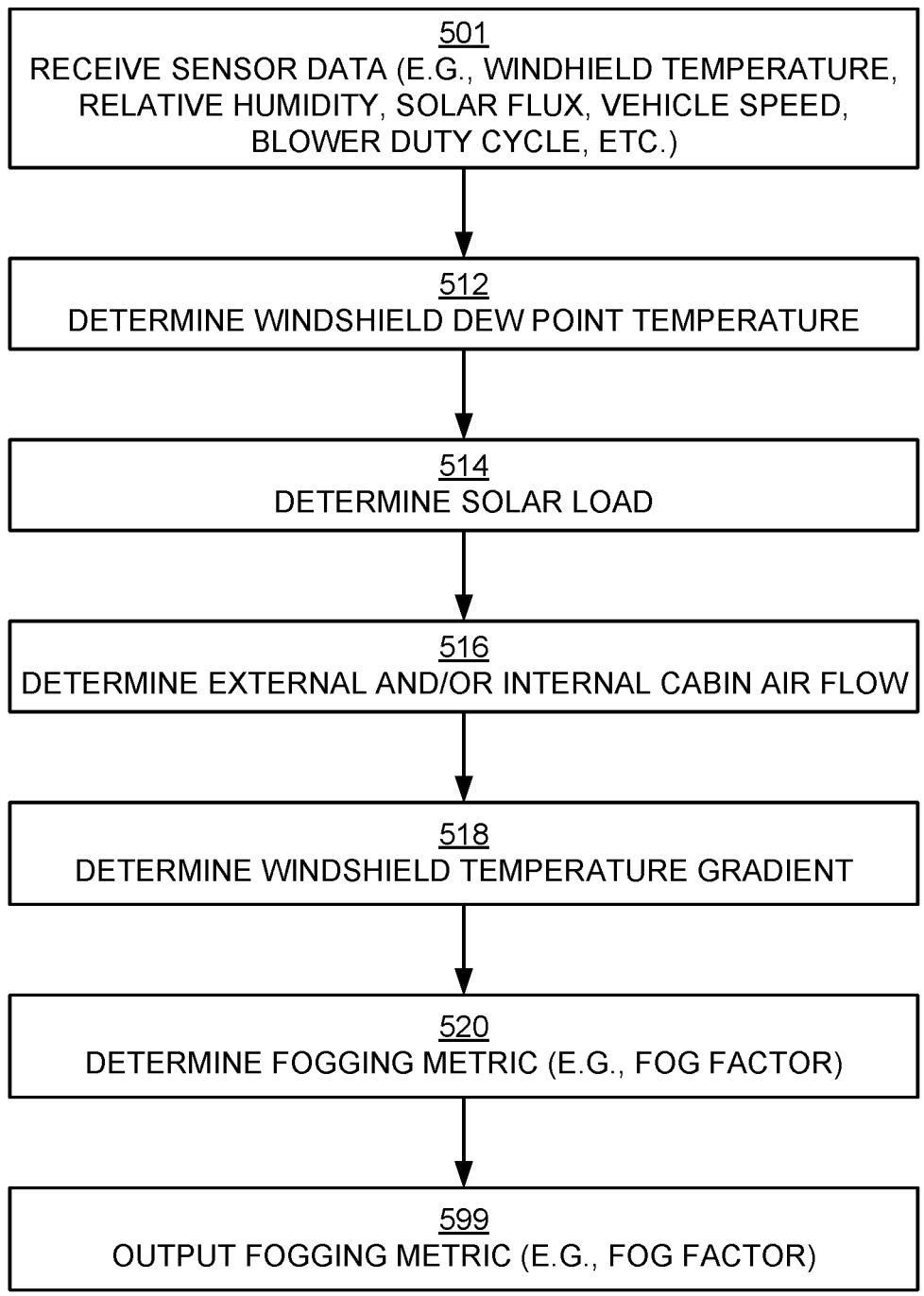
FIG. 5 is a flowchart of an illustrative process for detecting fogging conditions in accordance with one or more implements of the present disclosure.

FIG. 5 is a flowchart of illustrative process 500 for detecting fogging conditions, in accordance with some embodiments of the present disclosure. To illustrate, process 500 may be the same as or otherwise include at least some of the same processes of step 411 of process 400. Process 500 may be performed by control system 320 of FIG. 3 (e.g., control circuitry 321, cabin manager 326, or both), cabin controller 104 of FIG. 1, any other suitable system, or any combination thereof. For example, computer readable instructions for implementing process 500 may be stored in memory 325.

Step 501 includes receiving sensor data as one or more inputs such as, for example, one or more sensor signals, any other suitable input, or any combination thereof. In some embodiments, at step 501, the system determines a value of an input based on received sensor signals, reference information (e.g., physical constants, parameters, scaling coefficient), models, logic operations, any other suitable criterion, or any combination thereof. As illustrated, the system may receive or otherwise determine a windshield temperature $T_w$, relative humidity $RH_w$ (e.g., corresponding to the windshield, such as windshield relative humidity), solar flux (e.g., irradiation in a suitable spectral range as measured by an absorption sensor, vehicle speed (e.g., based on a motor speed or shaft speed), blower duty cycle $D_B$, any other suitable input, or any combination thereof.

Step 512 includes determining a windshield dew point temperature TDPw (e.g., based on windshield relative humidity $RH_w$). For example, for a particular value of relative humidity, and optionally based on a barometric pressure or other state information, the system may determine a temperature at which water vapor in the air will begin to condense from the vapor phase to the liquid phase (e.g., the dew point temperature).

Step 514 includes determining whether solar load is present, or otherwise determine an indication of solar load. In some embodiments, the system determines a binary classification (e.g., "yes" or "no" regarding whether there is solar loading). In some embodiments, the system determines a value, qualitative indication, or quantitative indication of solar load. For example, in some embodiments, the system may estimate an amount of solar flux, an amount of heat absorbed from solar flux, a temperature difference arising from solar flux, any other suitable value, or any combination thereof. To illustrate, for negligible or otherwise lesser values of solar flux, the system may determine the solar load is negligible or otherwise there is no solar load. For greater values of solar flux, the system may determine a solar load value or otherwise determine there is solar loading.

Step 516 includes determining an indication of external cabin airflow, internal cabin airflow, or a combination thereof. In some embodiments, the system determines a binary classification (e.g., "yes" or "no" regarding whether there is airflow). In some embodiments, the system determines a value, qualitative indication, or quantitative indication of airflow or convection at the exterior (e.g., based on vehicle speed, ambient conditions) and/or interior of the cabin (e.g., based on blower speed or duty cycle). For example, in some embodiments, the system may estimate an amount of airflow (e.g., a rate), an air velocity, an air convective coefficient, a temperature difference arising from convection, any other suitable value, or any combination thereof. To illustrate, for negligible or otherwise lesser values of airflow (e.g., zero vehicle speed, zero blower duty cycle), the system may determine the cabin flow is negligible or otherwise there is no cabin flow. For greater values of vehicle speed and/or blower duty cycle, the system may determine a cabin airflow value or otherwise determine there is cabin airflow.

Step 518 includes determining a windshield temperature gradient $\Delta T_w$. In some embodiments, the system may determine (e.g., estimate) a difference in windshield temperature at two or more different locations on the windshield to calculate the windshield temperature gradient. In some embodiments, the system may determine based on steps 514 and 516 a windshield temperature gradient. For example, for greater solar loading and greater cabin airflow, the system may estimate a larger value of the windshield temperature gradient. In some embodiments, the system may apply a heat transfer model to the windshield domain (e.g., solid state conductivity), with convective and radiative boundary conditions to estimate the windshield temperature gradient. The system may determine the windshield temperature gradient in units of temperature (e.g., temperature difference), temperature per unit length (K/m), non-dimensional units (e.g., normalized), any other suitable units indicative of a temperature gradient, or any combination thereof. To illustrate, the system may determine a 0-D (e.g., a single value or a point), 1-D (e.g., a vector or a line), 2-D (e.g., a 2-D array or a plane), or 3-D (e.g., a 3-D array or a volume) indication of the gradient. To illustrate, because the windshield temperature may be measured at one location (e.g., a sensor location), the temperature gradient accounts for changes from that measured temperature spatially across the windshield.

Step 520 includes determining the fogging metric such as a fog factor ("FF"). The system can use FF=Tw−ΔTw−TDPw to determine the fog factor. The system can determine the fogging metric based on a function (e.g., parameterized, piecewise), a set of logic operations, a database or lookup table, any other suitable mapping or relationship, or any combination thereof. In an illustrative example, the system may implement step 520 to create a virtual sensor for measuring fogging or expectation for fogging. In some circumstances, condensation is not directly measured by a sensor and the system uses available sensor signals, conditions, and physical models to estimate fogging in real time. The fog factor of step 520 may provide an indication of fogging or otherwise may be used to determine how clear the windshield or windows are for viewing by the occupant.

Step 599 includes outputting the fogging metric of step 520. For example, as illustrated, for increased values of FF, the less likely fog is to be present. For lesser values of FF, the more likely fog is to be present. For example, for FF values less than zero, complete fogging is expected. For FF values in a first range (e.g., 0-5), partial fogging is expected (e.g., patchy fog covering most but not all of the windshield). For FF values in a second range (e.g., 5-10), partially clearing is expected (e.g., patchy fog covering only a portion of the windshield). For FF values in a third range (e.g., greater than 10), complete clearing is expected (e.g., no water condensed on the windshield). While illustrated for a nominal range of 0-10, a fogging metric may be scaled in any suitable manner (e.g., 0 to 1, −1 to 1, 0 to 100), classified as belonging to a range (e.g., without a numerical value), or may be unscaled (e.g., and compared with a suitable reference or guide).

Figure 6:
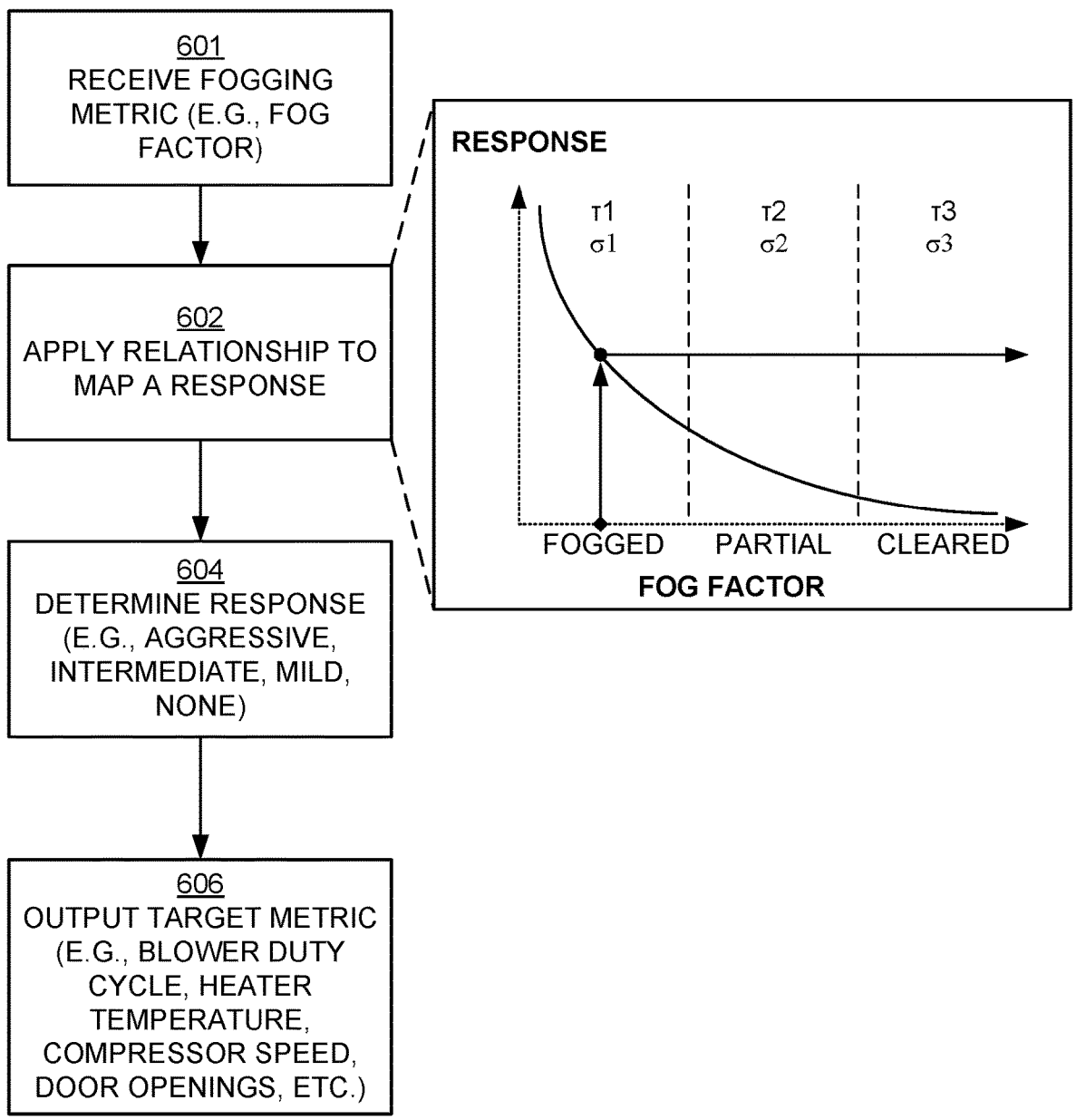
FIG. 6 is a flowchart of an illustrative process for responding to fogging conditions in accordance with one or more implements of the present disclosure.

FIG. 6 is a flowchart of illustrative process 600 for responding to fogging conditions, in accordance with some embodiments of the present disclosure. To illustrate, process 600 may be the same as or otherwise include at least some of the same processes of step 412 of process 400. To illustrate further, process 600 may be applied to the output of process 500 to determine a response to the fogging metric determined during process 500. Process 600 may be performed by control system 320 of FIG. 3 (e.g., control circuitry 321, cabin manager 326, or both), cabin controller 104 of FIG. 1, any other suitable system, or any combination thereof. For example, computer readable instructions for implementing process 600 may be stored in memory 325.

Step 601 includes receiving input such as, for example, a determined fogging metric such as fog factor, one or more sensor signals, any other suitable input, or any combination thereof. In some embodiments, the input received at step 601 can include the output provided at step 500 of process 500.

Step 602 includes mapping a response to the input received at step 601. As illustrated, a fogging metric such as a fog factor may be received at step 601, and the system may map a response metric using a relationship (e.g., which may be a function). As illustrated, the relationship can be an exponential function, which may be continuous, piecewise continuous, or other suitable exponential functions. For example, in some embodiments, relationship may be characterized as one or more of the following:

$$\text{Response} = Ae^{-FF/\sigma} \quad \text{Relationship 1}$$

$$\text{Response} = \begin{cases} Ae^{-FF/\sigma 1} & \text{for } FF0{:}FF1 \\ Ae^{-FF/\sigma 2} & \text{for } FF1{:}FF2 \\ Ae^{-FF/\sigma 3} & \text{for } FF2{:}FF3 \end{cases} \quad \text{Relationship 2}$$

$$\{\text{Response}, \tau\} = f(FF, \sigma_i, A) \quad \text{Relationship 3}$$

where "A" is a coefficient of order one "O(1)," "FF" is fog factor or other suitable fogging metric, and "σ" is a scaling factor. In some embodiments, σ may be dependent on FF (e.g., factors σ1, σ2, and σ3, which may be the same or different, in ranges defined by fog factor values FF0, FF1, FF2, and FF3). In some embodiments, a time scale for response can be determined based on FF (e.g., time constants τ1, τ2, and τ3) to affect how quickly the system responds to the fogging metric. It will be understood that although three ranges are shown for FF in FIG. 6, any suitable discretization may be used in accordance with the present disclosure (e.g., one range, two ranges, more than three ranges). The system may implement any or all of relationships 1-3 above, any other suitable relationship, or any combination thereof. In some embodiments, the system may map a value of a fogging metric (e.g., indicated by the ♦ symbol) to a response value based on the relationship (e.g., indicated by the ● symbol).

Step 604 includes determining a response based on the mapping of step 602. In some embodiments, a fogging metric in the "FOGGED" range corresponds to an aggressive response (e.g., greater response), a fogging metric in the "PARTIAL" range corresponds to an intermediate response (e.g., a relatively lesser response), and a fogging metric in the "CLEARED" range corresponds to a mild response or otherwise no response. Based on the response (e.g., aggressive, intermediate, mild, or none), the system may determine a setpoint, a change to a setpoint, a target value, a rate, any other suitable response, or any combination thereof. In some embodiments, steps 602 and 604 may be combined, wherein the response is mapped to the fogging metric without classifying the fogging metric or response. For example, a response such as blower duty cycle, heater temperature, compressor speed, or duct door positions may be mapped directly to FF without necessarily classifying as aggressive or mild.

Step 606 includes determining a target output, based on the determined response at step 604. In some embodiments, step 606 includes generating a control signal based on the target output. In some embodiments, step 606 includes causing at least one climate control device to affect a change to the cabin conditions to reduce fogging, increase comfort, prevent an increase in fogging, prevent an increase in discomfort, or a combination thereof. For example, the blower duty cycle may be increased (e.g., more aggressive response) to increase blower motor speed and thus air flow and thus convection in the vehicle interior. In a further example, a temperature of a heater may be increased (e.g., more aggressive response), by increasing current flow, to raise the air discharge temperature and thus lower relative humidity and the propensity for fogging. In a further example, a compressor speed may be increased (e.g., more aggressive response), by increasing compressor motor currents, to increase a pressure differential and/or mass flow rate of refrigerant, thus resulting in increased heat transfer and/or lower AC temperatures. In a further example, one or more duct doors may be opened or closed to direct airflow, increase or decrease air flow rate, affect air discharge temperature, or a combination thereof. To illustrate, door openings may be adjusted to direct more airflow to the windshield to improve defogging or defrosting (e.g., more aggressive response for view clearing), or direct more airflow to the cabin towards the occupant to affect comfort (e.g., breath temperature).

Figure 7:
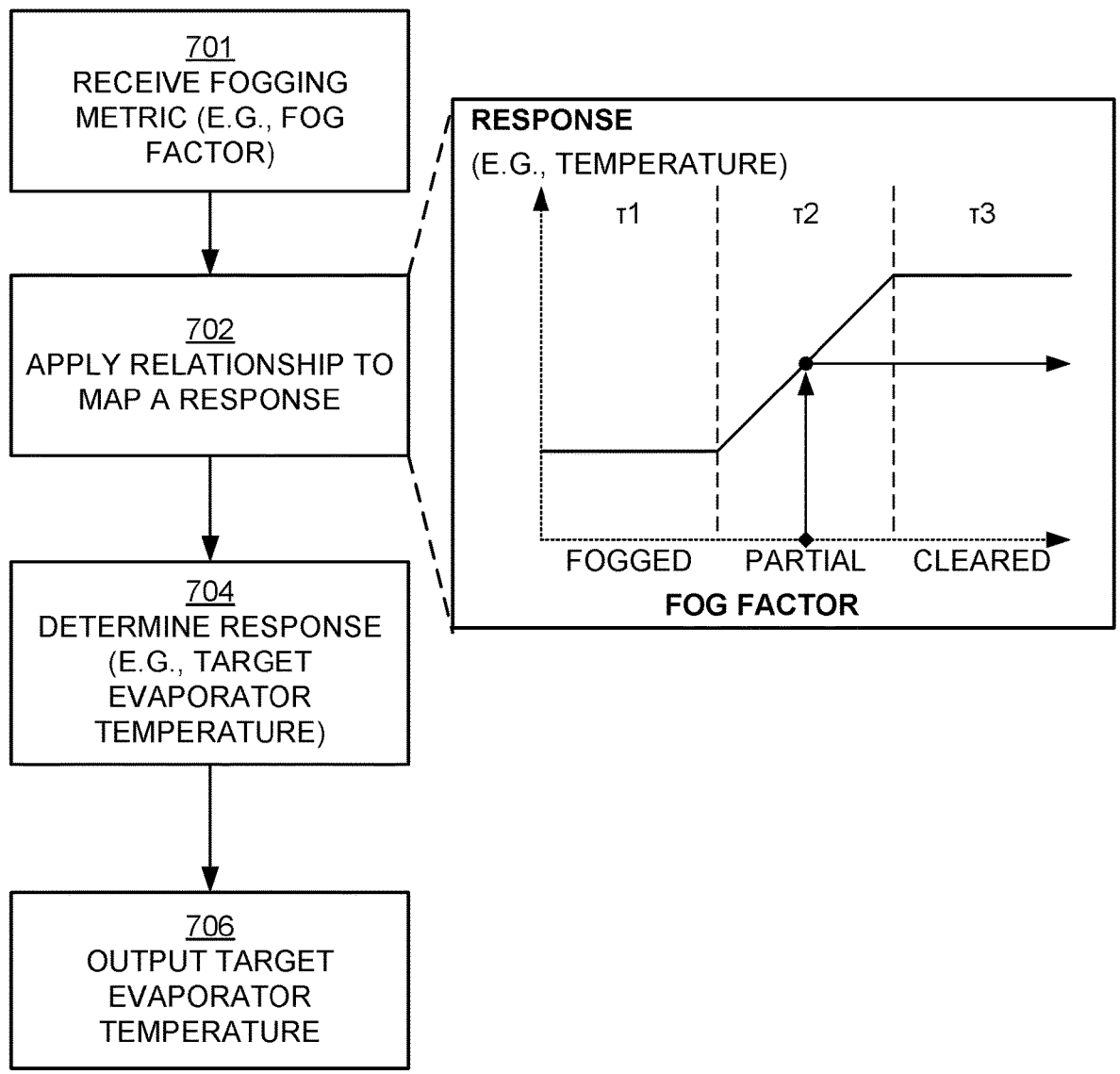
FIG. 7 is a flowchart of an illustrative process for responding to fogging conditions in accordance with one or more implements of the present disclosure.

FIG. 7 is a flowchart of illustrative process 700 for responding to fogging conditions, in accordance with some embodiments of the present disclosure. The process 700 of FIG. 7 can be performed in addition to or as an alternative to the process 600 of FIG. 6. For example, the process 700 can be performed to determine certain outputs (e.g., blower duty cycle, heater temperature, compressor speed, or duct door positions), and the process 700 can be performed to determine other outputs (e.g., target evaporator temperature).

In particular, the response can include a determination and selection of a target evaporator temperature. To illustrate, process 700 may be the same as or otherwise include at least some of the same processes of step 412 of process 400. To illustrate further, process 700 may be applied to the output of process 500 to determine a response to the fogging metric determined during process 500. Process 700 may be performed by control system 320 of FIG. 3 (e.g., control circuitry 321, cabin manager 326, or both), cabin controller 104 of FIG. 1, any other suitable system, or any combination thereof. For example, computer readable instructions for implementing process 700 may be stored in memory 325.

Step 701 includes receiving input such as, for example, a determined fogging metric such as fog factor, one or more sensor signals, any other suitable input, or any combination thereof. In some embodiments, the input received at step 701 can include the output provided at step 500 of process 500.

Step 702 includes mapping a response to the input received at step 701. As illustrated, a fogging metric such as a fog factor may be received at step 701, and the system may map a response metric using a relationship (e.g., which may be a function). As illustrated, relationship can be a function, which may be continuous, piecewise continuous, or other suitable exponential functions. For example, in some embodiments, the relationship may be characterized as one or more of the following:

$$\text{Response} = \begin{cases} T_{min} & \text{for } FF0{:}FF1 \\ A(FF) + c & \text{for } FF1{:}FF2 \\ T_{max} & \text{for } FF2{:}FF3 \end{cases} \quad \text{Relationship 4}$$

$$\text{Response} = A(FF) + c \quad \text{Relationship 5}$$

$$\{\text{Response}, \tau\} = f(FF, A, c) \quad \text{Relationship 6}$$

where "A" is a coefficient of order one "O(1)," "FF" is fog factor or other suitable fogging metric, and "c" is a constant. It will be understood that although three ranges are shown for FF in FIG. 7, any suitable discretization may be used in accordance with the present disclosure (e.g., one range, two ranges, more than three ranges). The system may implement any or all of relationships 4-6 above, any other suitable relationship, or any combination thereof. In some embodiments, the system may map a value of a fogging metric (e.g., indicated by the ♦ symbol) to a response value based on the relationship (e.g., indicated by the ● symbol).

In some embodiments, the relationship can include fixed values for at least some fog factor values. For example, in relationship 4 and for fog factor values between FF0 and FF1 (e.g., inclusive and/or exclusive), the response value can be fixed. This response value can correspond to a minimum value for a target evaporator temperature. A minimum temperature ($T_{min}$) for the target evaporator temperature can be selected based on a lowest temperature at which the evaporator can be operated (e.g., absolute minimum or lowest given one or more other parameters, such as efficiency targets). It will be understood that any value for $T_{min}$ can be selected based on one or more features of the system and/or detected conditions.

By further example, in relationship 4 and for fog factor values between FF2 and FF3 (e.g., inclusive and/or exclusive), the response value can be fixed. This response value can correspond to a maximum value for a target evaporator temperature. A maximum temperature ($T_{max}$) for the target evaporator temperature can be selected based on the dewpoint for a cabin of the vehicle at a particular temperature and relative humidity. For example, a maximum temperature for the target evaporator temperature can be selected as the dewpoint for a cabin of a vehicle at a particular temperature and relative humidity. It will be understood that any value for $T_{max}$ can be selected based on one or more features of the system and/or detected conditions. For example, such parameters can correspond to manually selected values and/or values determined by a standard, such as ASHRAE Standards.

In some embodiments, the relationship can include a linear function for at least some of the ranges defined by fog factor values FF0, FF1, FF2, and FF3. For example, the response can be directly proportional or otherwise positively correlated to the fog factor. Accordingly, at higher fog factor values, a greater value for a response can be determined. It will be understood that any one or more of a variety of formulas (e.g., linear, logarithmic, exponential, stepwise, etc.) can be applied to calculate the response value.

Between the minimum and maximum temperatures for the target evaporator temperature, the relationship can define a continuous range of target temperatures that vary based on the fog factor. For example, in relationship 4 and for fog factor values between FF1 and FF2 (e.g., inclusive and/or exclusive), the response can be continuously variable within a range that extends between (e.g., inclusive and/or exclusive) $T_{min}$ and $T_{max}$. As such, for any given value of fog factor between FF1 and FF2, there is a corresponding value for a target evaporator temperature. For example, $T_{min}$ can define a minimum target temperature at fog factor FF1, $T_{max}$ can define a maximum target temperature at fog factor FF2, and an intermediate temperature ($T_{int}$) can define an intermediate target temperature corresponding to a value between FF1 and FF2.

In some embodiments, the relationship can establish a range of available target evaporator temperatures. For example, in relationship 4 and for fog factor values between FF1 and FF2 (e.g., inclusive and/or exclusive), a continuous range of temperatures can be provided at which the evaporator can be operated with a target temperature. As such, the evaporator need not be limited to a limited number of discrete temperatures. Rather, it can be continuously adjustable to adapt to detected conditions, such as fog factor.

In some embodiments, the relationship can be uniformly continuous for at least a range of fog factor values (e.g., between FF1 and FF2). For example, each of the available evaporator temperatures (e.g., between $T_{min}$ and $T_{max}$) corresponds to a different value for the fog factor (e.g., between FF1 and FF2). As such, any given detected fog factor can be addressed with a response that is unique from any other detected fog factor.

In some embodiments, the relationship can include discrete values for target evaporator temperatures each correlated with corresponding values or ranges for fog factor. For example, such correspondences can be stored in a lookup table. Determining the target evaporator temperature can include comparing the fog factor to a lookup table correlating the fog factor or ranges of fog factors to the target evaporator temperature. As such, any given value for fog factor can be applied to determine the appropriate target evaporator temperature.

Accordingly, by adjusting the target evaporator temperature, the operation of the evaporator can be adjustably tailored to the needs of addressing a fog factor while also maximizing efficiency of the overall system. In particular, the evaporator can be operated at a target temperature that is sufficiently low to address the detected fog factor without expending more energy than is necessary to achieve such a result. For example, at high values of fog factor (e.g., partial or cleared), the evaporator can be operated at a higher target temperature to reduce energy consumption, once it has been determined that lower target temperatures are not necessary for addressing fog accumulation.

In some embodiments, certain values (e.g., coefficients and/or constants) of a relationship may be dependent on FF which may be the same or different, for example in ranges defined by fog factor values FF0, FF1, FF2, and FF3. In some embodiments, as shown in relationship 6, a time scale for response can be determined based on FF (e.g., time constants τ1, τ2, and τ3) to affect how quickly the system responds to the fogging metric.

Step 704 includes determining a response based on the mapping of step 702. In some embodiments, a fogging metric in the "FOGGED" range (e.g., FF0 to FF1) corresponds to a lower temperature (e.g., greater response), a fogging metric in the "PARTIAL" range (e.g., FF1 to FF2) corresponds to an intermediate temperature (e.g., a relatively lesser response), and a fogging metric in the "CLEARED" range (e.g., FF2 to FF3) corresponds to a higher temperature. Based on the response, the system may determine a setpoint, a change to a setpoint, a target value, a rate, any other suitable response, or any combination thereof. In some embodiments, steps 702 and 704 may be combined, wherein the response is mapped to the fogging metric without classifying the fogging metric or response. For example, a response such as target evaporator temperature may be mapped directly to FF without necessarily classifying as aggressive or mild.

Step 706 includes determining a target output, based on the determined response at step 704. In some embodiments, step 706 includes generating a control signal based on the target output. In some embodiments, step 706 includes causing at least one climate control device to affect a change to the cabin conditions to reduce fogging, increase comfort, prevent an increase in fogging, prevent an increase in discomfort, or a combination thereof. For example, a target evaporator temperature of an evaporator can be managed. It will be understood that such adjustments can be made in combination with and/or in place of one or more other controlled parameters described herein (e.g., blower duty cycle, a temperature of a heater, a compressor speed door openings, etc.).

Figure 8:
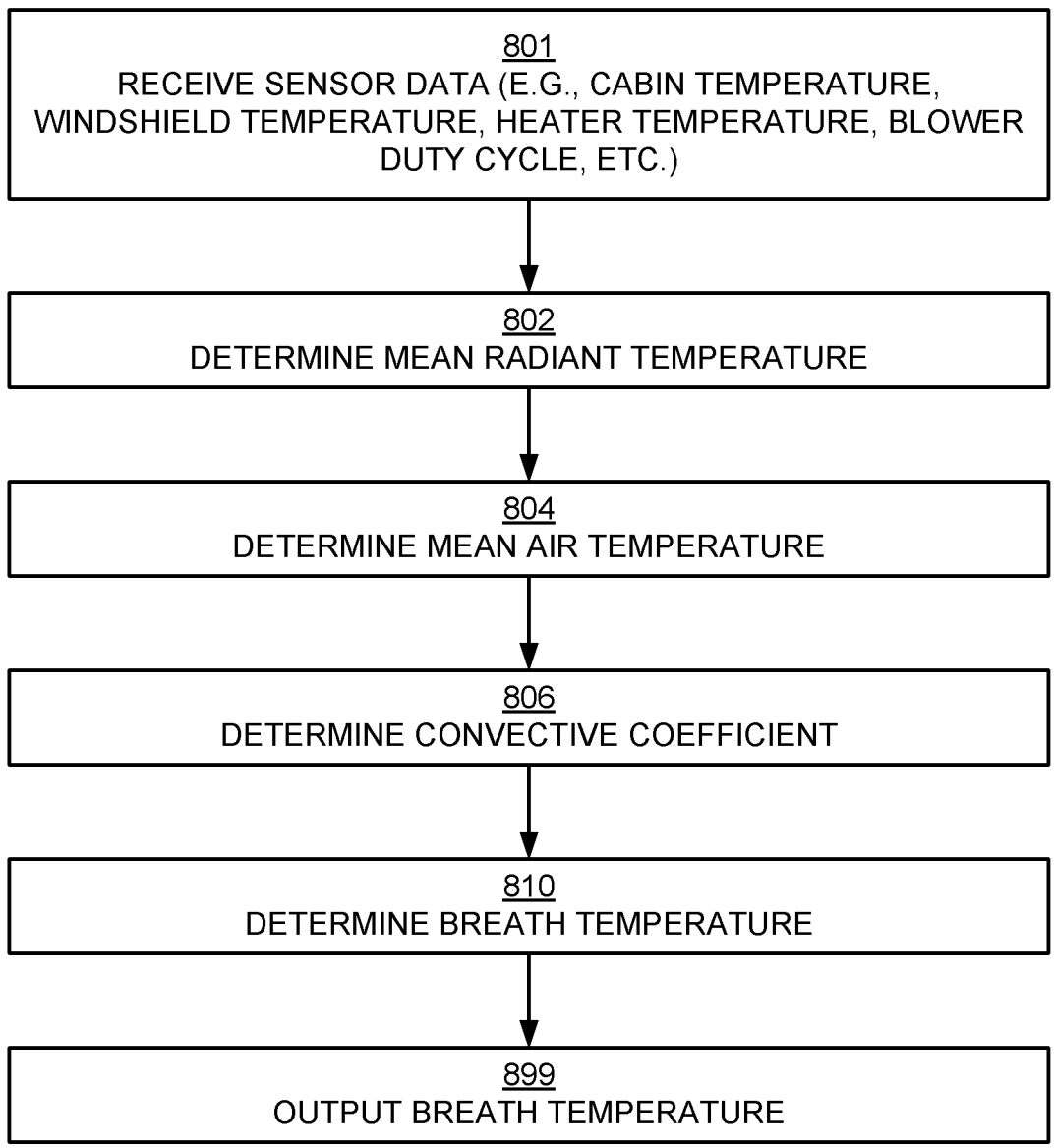
FIG. 8 is a flowchart of an illustrative process for detecting breath temperature in accordance with one or more implements of the present disclosure.

FIG. 8 is a flowchart of illustrative process 800 for detecting breath temperature, in accordance with some embodiments of the present disclosure. To illustrate, process 800 may by the same as or otherwise include at least some of the same processes of step 421 of process 400. Process 800 may be performed by control system 320 of FIG. 3 (e.g., control circuitry 321, cabin manager 326, or both), cabin controller 104 of FIG. 1, any other suitable system, or any combination thereof. For example, computer readable instructions for implementing process 800 may be stored in memory 325.

Step 801 includes receiving sensor data as one or more inputs. For example, the system may receive sensor data such as, for example, one or more sensor signals, any other suitable input, or any combination thereof. In some embodiments, at step 801, the system determines a value of an input based on received sensor signals, reference information (e.g., physical constants, parameters, scaling coefficient), models, logic operations, any other suitable criterion, or any combination thereof. As illustrated, the system may receive or otherwise determine a cabin temperature $T_{cab}$, windshield temperature $T_w$, heater temperature $T_{PTC}$, blower duty cycle $D_B$, any other suitable input, or any combination thereof.

Step 802 includes determining a mean radiant temperature $T_{rad}$. In some embodiments, the mean radiant temperature is a function of cabin temperature $T_{cab}$ and windshield temperature $T_w$, such as $T_{rad}=f_1(T_{cab}, T_w)$, for example. In some embodiments, $T_{rad}$ need not be determined based on a function and may be determined based on any suitable inputs or combination of inputs, using any suitable mapping (e.g., a function, a database, set of logic operations, a model, or a combination thereof).

Step 804 includes determining a mean air temperature $T_{air}$. In some embodiments, the mean air temperature is a function of cabin temperature $T_{cab}$, windshield temperature $T_w$, and heater temperature $T_{PTC}$, such as $T_{air}=f_2(T_{cab}, T_w, T_{PTC})$, for example. In some embodiments, $T_{air}$ need not be determined based on a function and may be determined based on any suitable inputs or combination of inputs, using any suitable mapping (e.g., a function, a database, set of logic operations, a model, or a combination thereof).

Step 806 includes determining a convective coefficient C (e.g., corresponding to the vehicle interior or a portion thereof). In some embodiments, the convective coefficient is a function of blower duty cycle $D_B$, such as $C=f_3(D_B)$, for example. In some embodiments, C need not be determined based on a function and may be determined based on any suitable inputs or combination of inputs, using any suitable mapping (e.g., a function, a database, set of logic operations, a model, or a combination thereof). In an illustrative example, the system may determine the convective coefficient using $C=aB^c$, wherein "a" is a coefficient, B is blower speed (e.g., as determined based on a sensor such as an encoder or based on blower duty cycle), and "c" is an exponent.

Step 810 includes determining (e.g., estimating) a breath temperature $T_b$. For example, in some embodiments, the breath temperature is determined based on the output of steps 802, 804, and 806, as illustrated. In a further example, the breath temperature may be a function of mean radiant temperature $T_{rad}$, mean air temperature $T_{air}$, and convective coefficient C, such as $T_b=f_4(T_{rad}, T_{air}, C)$, for example. In an illustrative example, the system may determine the breath temperature using $T_b=T_{rad}+C(T_{air}-T_{rad})$, wherein C is of order one O(1).

Step 899 includes outputting the breath temperature $T_b$ of step 810.

In an illustrative example, the system may implement process 800 to create a virtual sensor for measuring breath temperature. In some circumstances, breath temperature is not directly measured (e.g., no sensor located on or very near an occupant) and the system uses available sensor signals, conditions, and physical models to estimate breath temperature in real time. In some embodiments, the system may determine a single scalar temperature value. In some embodiments, the system may determine a scalar temperature field (e.g., at predetermined locations or domains), a gradient (e.g., a single value or a field), a temporal change (e.g., a time derivative or difference), any other suitable value or set of values, or any combination thereof. The output of process of 800 may include a breath temperature estimate, which provides an indication of comfort or otherwise may be used to determine an indication of comfort for the occupant.

Figure 9:
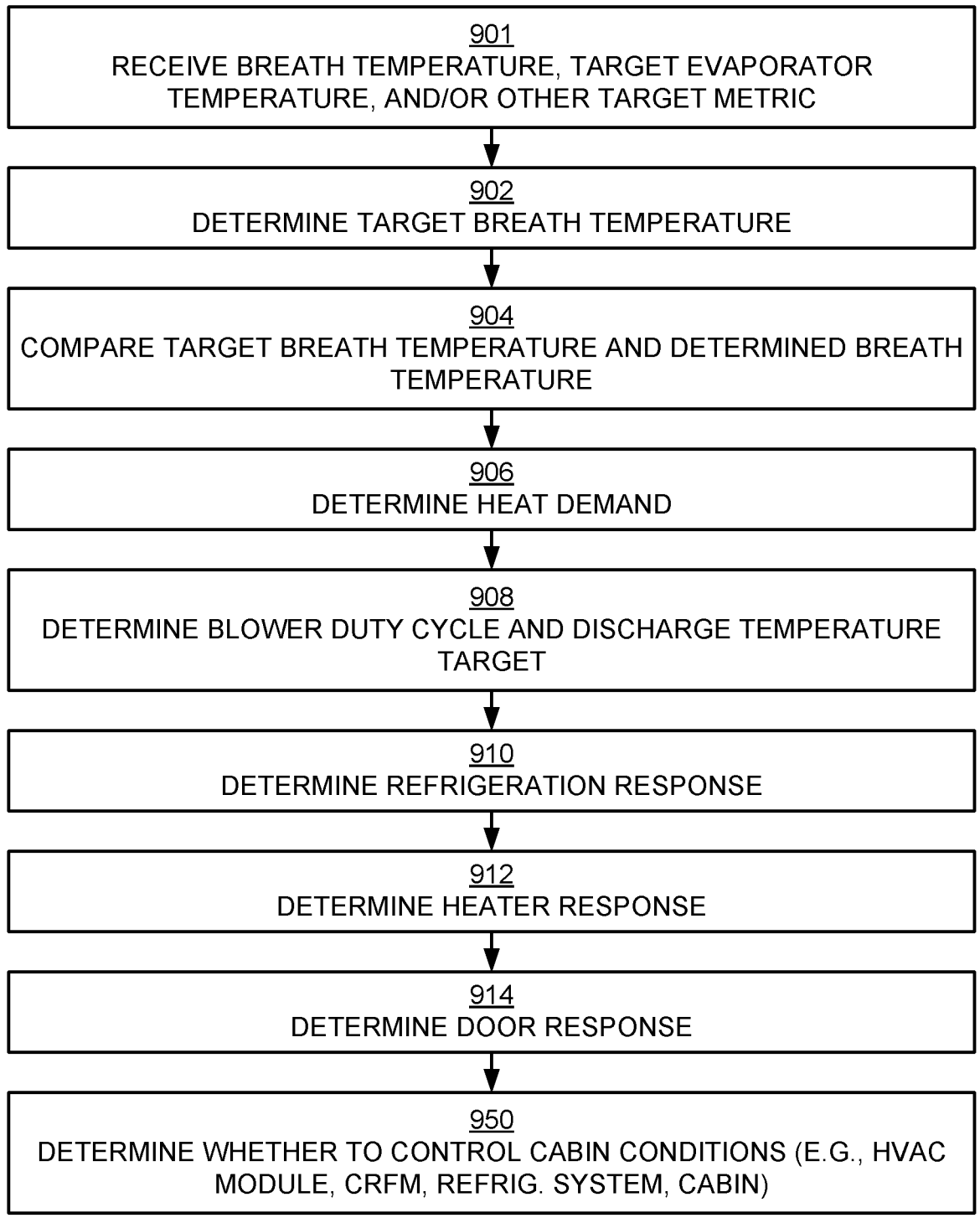
FIG. 9 is a flowchart of an illustrative process for responding to breath temperature in accordance with one or more implements of the present disclosure.

FIG. 9 is a flowchart of illustrative process 900 for responding to breath temperature, in accordance with some embodiments of the present disclosure. To illustrate, process 900 may be the same as or otherwise include at least some of the same processes of step 422 of process 400. To illustrate further, process 900 may be applied to the output of process 800 to determine a response to the temperature metric determined during process 800. Process 900 may be performed by control system 320 of FIG. 3 (e.g., control circuitry 321, cabin manager 326, or both), cabin controller 104 of FIG. 1, any other suitable system, or any combination thereof. For example, computer readable instructions for implementing process 900 may be stored in memory 325.

Step 901 includes receiving or otherwise determining a breath temperature based on cabin conditions and/or a target evaporator temperature. In some embodiments, the input received at step 901 can include an output provided at step 899 of process 800. In some embodiments, the input received at step 901 can include an output provided at step 706 of process 700. In some embodiments, the input received at step 901 can include an output provided at step 606 of process 600.

Step 902 includes determining a target breath temperature. In some embodiments, the system may receive a user setpoint or a setpoint provided by cabin manager 326 (e.g., based on reference information or user preferences). For example, the user may adjust a setpoint using user interface 340 of FIG. 3, which may include a button, a turnable knob, a sliding switch or selector, any other suitable selectable options, or any combination thereof. The selectable option may correspond to a desired temperature, a desired heating or cooling rate, any other suitable cabin setting, a change thereof, or any combination thereof.

Step 904 includes determining a difference between the target breath temperature of step 902 and the determined breath temperature based on cabin conditions at step 901. The difference (e.g., $\Delta T$) is indicative of the difference between the current conditions and target conditions of the cabin, and accordingly the system may determine a relatively greater response based on a relatively greater difference.

Step 906 includes determining a heat demand or other indication of target heating or cooling. In some embodiments, the system may determine a total heat that must be removed or provided and also a heat rate to govern the rate at which heat is removed or added. For example, the heat removal may be estimated as $Q=mC\Delta T$, or in rate form as $dQ/dt=d(mCT)/dt$ or in some circumstances $dQ/dt=massflow_{air}*C*\Delta T$. In some embodiments, the heat transfer rate may be limited based on system performance limitations, limitations to changes to user comfort, predetermined saturation limits, any other suitable criterion, or any combination thereof. The system may determine the heating or cooling demand based on a function, lookup table, database, logical operations, any other suitable relationship, any other suitable information, or any combination thereof.

Step 908 includes determining a target blower duty cycle, target discharge temperature, any other suitable target value, or any combination thereof. For example, based on the heat/cool demand of step 906, the system may determine a $massflow_{air}$, target discharge air temperature, or any other suitable parameter, and then determine a blower duty cycle based on the parameter(s). In some embodiments, the system may use a reference (e.g., stored in memory 325) relationship between heat/cool demand, blower duty cycle, and target discharge temperature.

Step 910 includes determining a refrigeration response or otherwise generate one or more control signals for controlling the refrigeration system (e.g., to control a compressor speed or other aspect of the system). For example, in some embodiments, at step 910, the system determines a target compressor speed and generates a corresponding control signal (e.g., a voltage, current, PWM duty cycle, or any other suitable signal). In some embodiments, at step 910, the system may determine a target evaporator temperature (e.g., based on the result of step 706 of process 700), refrigerant flow rate, or other parameter, and then determine a corresponding compressor speed. Referencing FIG. 3, control system 320 may transmit a control signal to compressor 371 of refrigeration system 370, to control the speed of compressor 371 (e.g., by controlling a speed of a compressor motor).

Step 912 includes determining a heater response based on the target discharge temperature of step 908. For example, in some embodiments, the system determines a target discharge temperature at step 908, and then determines a current flow at step 912 that corresponds to the target discharge temperature. In some embodiments, at step 912, the system determines a heating rate (e.g., the product of current and voltage), a commanded current, a saturation or limit to heating rate, a change in heating rate, a duty cycle (e.g., a PWM duty cycle), any other suitable parameter, or change thereof, or any combination thereof to affect operation of a heater (e.g., a positive temperature coefficient heater (PTC) that may include ceramic). To illustrate, the greater the target discharge temperature (e.g., as compared to a reference or measured temperature), the greater the heater response. Referencing FIG. 3, control system 320 may transmit a control signal to heating system 380 to control heating rate, temperature, or both of a heater of heating system 380.

Step 914 includes determining a response for one or more doors of a ducting system of the cabin system. For example, at step 914, the system may determine a respective position or change in position for each door of a set of one or more doors, and then generate a respective control signal to control a respective actuator coupled to each respective door. Referencing FIG. 3, control system 320 may transmit a control signal to duct door(s) 362 of cabin air system 360 to control a position of duct door(s) 362.

Step 950 includes determining whether to control cabin conditions by controlling an HVAC module, condenser/radiator/fan module (CRFM), refrigeration system, any other suitable system or climate control device thereof, or any combination thereof. For example, the temperature, convective environment (e.g., airflow rate and distribution), or a combination thereof of the cabin may be affected by steps 910, 912, and 914. In some embodiments, based on the cabin air conditions or changes thereof in the cabin, the system may estimate breath temperature at step 901 as part of the feedback control loop to control cabin conditions based on user input.

In some embodiments, the output of step 950 of process can be provided as an input for step 430 of the process 400.

As illustrated, processes 500, 600, 700, 800, and 900 of FIGS. 5-9 may be implemented by process 400 of FIG. 4. For example, process 400 may include fog detection (e.g., process 500), determine a response to fogging (e.g., processes 600 and/or 700), temperature detection (e.g., process 800), and/or determining a response to the temperature detection (e.g., process 900).

In an illustrative example, process 500 may include determining a fogging metric for a vehicle interior and process 800 may include determining a breath temperature metric. Steps 430, 432, 520, 599, 604, 606, 704, 706, 908, 910, 912, 914, 950, or a combination thereof may include determining a response based on the fogging metric and the breath temperature metric. For example, processes 600, 700, and 900 may include determining respective responses for view clearing and cabin comfort. Steps 432, 434, 599, 606, 706, and 950 may include controlling at least one climate control device based on the response.

In a further illustrative example, determining a fogging metric (e.g., at step 411 and/or step 520) may include determining a relative humidity corresponding to a windshield of the vehicle, determining a temperature corresponding to the windshield, determining a solar flux corresponding to the windshield, determining a blower duty cycle, determining any other suitable metric indicative of fogging or visibility, or any combination thereof.

In a further illustrative example, determining the fogging metric (e.g., at step 411) may include determining, or otherwise be based on, a dewpoint temperature corresponding to a windshield, a temperature corresponding to the windshield, and a temperature gradient corresponding to the windshield. For example, the temperature gradient may be estimated or otherwise determined based on a solar flux and a cabin air flow rate.

In a further illustrative example, determining a response based on the fogging metric and the breath temperature metric comprises classifying the fogging metric based on a predetermined classification scheme. For example, the system at step 412, 520, 604, 606, 704, and/or 706, the system may access reference information (e.g., reference information provided in step 402), which may include a lookup table, database, state flow instructions, logic instructions, or other suitable information for instructions for determining the response based on the fogging metric. In a further example, the system may classify a range to which the fogging metric belongs (e.g., as falling between successive thresholds which define the range), and then determine the response based on the range. To illustrate, the classification scheme may allow for some discretization of the response based on discreet ranges or classes, rather than a continuous range of response. In some embodiments, the system need not use a classification scheme and may determine the response based on the fogging metric without classifying the fogging metric. In some embodiments, the system determines the response (e.g., based on the fogging metric and the breath temperature metric) by determining a response metric based on a functional relationship with the fogging metric. For example, the system may implement process 600 and/or process 700. In a further example, the response may include a blower duty cycle, a heater temperature, a compressor speed, an air system duct door position, any other suitable response, or combinations thereof.

In a further illustrative example, the system may determine a breath temperature metric at steps 421, 530, 810, or a combination thereof. The system may determine the breath temperature metric by determining a radiant temperature, determining an air temperature for the vehicle interior, determining a convection metric for the vehicle interior, determining any other suitable parameter or operating characteristic, or any combination thereof. In a further example, the system may determine the breath temperature metric by determining a difference between a target breath temperature and an estimated breath temperature, and then determine the response (e.g., based on the fogging metric and the breath temperature metric). In some embodiments, the system determines a heat demand metric (e.g., a target heat/cool amount, heating/cooling rate), determines a heating rate or cooling rate, and determines at least one of a blower duty cycle or a target air discharge temperature, or combinations thereof.

In a further illustrative example, the system may control the at least one climate control device (e.g., at any or all of steps 432, 434, 599, 606, 706, or 950) by controlling at least one of a blower, a resistance heater, a compressor, or an actuated duct door, or combinations thereof (e.g., one or more of output devices).

In a further illustrative example, determining the response based on the fogging metric and the breath temperature metric is based on a first climate control device of the at least one climate control device. For example, at any of steps 430, 432, 520, or 599 may include the system determining a first response based on the fogging metric (e.g., at step 604, 606, 704, and/or 706), determining a second response based on the breath temperature metric (e.g., at step 908, 910, 912, 914, or 950), and then comparing the first response to the second response.

In a further illustrative example, the system may receive a plurality of sensor signals from a plurality of sensors at any or all of steps 402, 501, 601, 701, or 801. To illustrate, the plurality of sensors may include, for example, at least one temperature sensor, at least one relative humidity sensor, a solar flux sensor, a vehicle speed sensor, any other suitable sensor, or any combination thereof.

In some circumstances, the system may operate in varying environmental climates and conditions, under varying operating conditions, and with varying user expectations or requirements. For example, in cold environments, the propensity to fog may be increased when the vehicle is starting, and the system may determine the response to favor view clearing. In some embodiments, the system may detect fogging additionally at a side window or rear window, by applying process 500. In some embodiments, the system may receive information about vehicle operating conditions or other vehicle information such as power consumption, power limits (e.g., current limits), component limits (e.g., maximum currents, speeds, or temperatures), user preferences, or a combination thereof to determine the response.

In some embodiments, the system determines a response for either or both of view clearing and breath temperature. In some embodiments, the system need not determine a response for both view clearing and breath temperature. For example, in some circumstances, the system may determine that the response for view clearing prevails and selects that response (e.g., during vehicle startup in cold weather). In a further example, if the ambient temperature is relatively large and/or the ambient humidity is relatively low, the system need not determine a fogging response.

Figure 10:
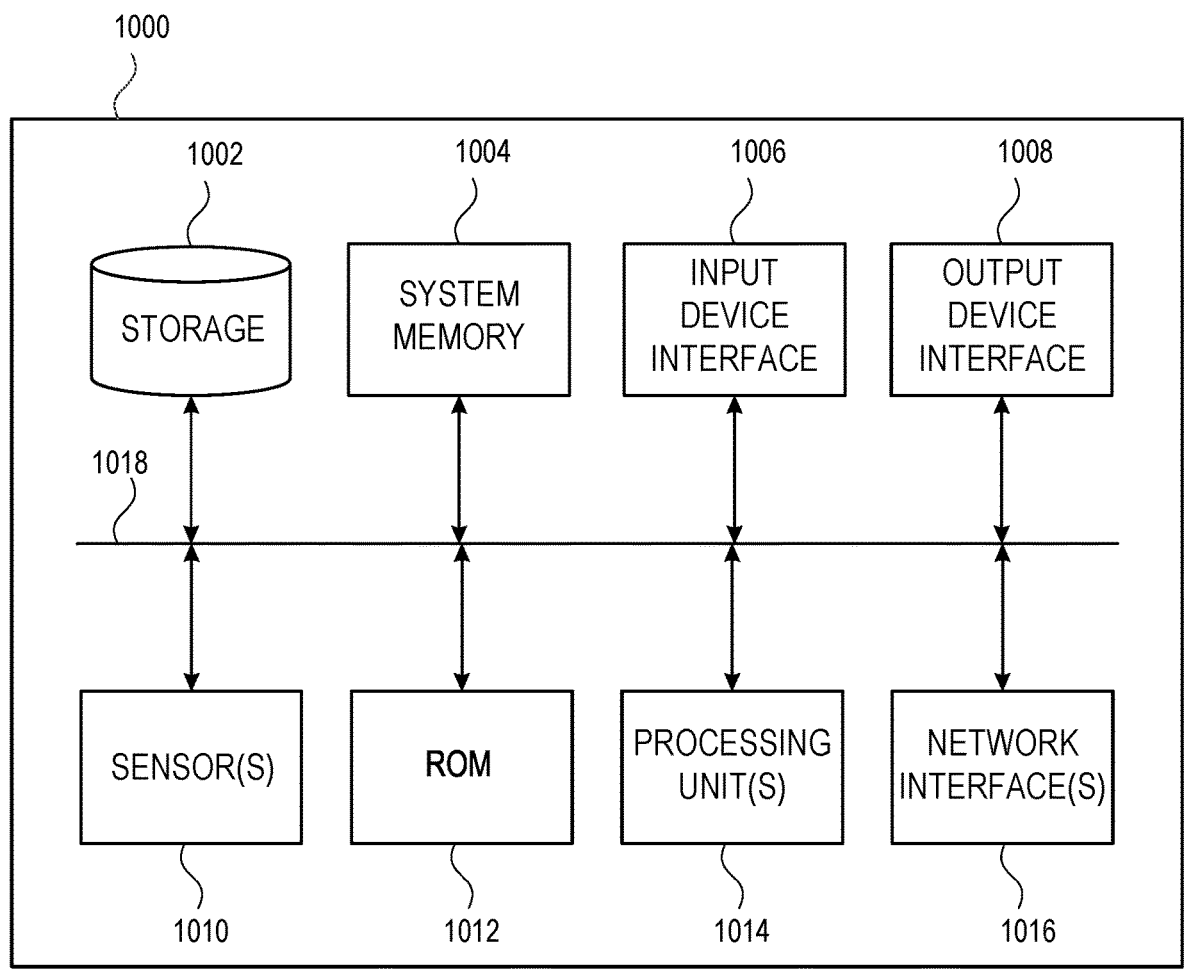
FIG. 10 is a block diagram of an illustrative system for managing cabin conditions of a vehicle, in accordance with some embodiments of the present disclosure.

FIG. 10 illustrates an example electronic system 1000 with which aspects of the present disclosure may be implemented. The electronic system 1000 can be, and/or can be a part of, any electronic device for providing the features and performing processes described in reference to FIGS. 1-10, including but not limited to a vehicle, computer, server, smartphone, and wearable device (e.g., authentication device). The electronic system 1000 may include various types of computer-readable media and interfaces for various other types of computer-readable media. The electronic system 1000 includes a persistent storage device 1002, system memory 1004 (and/or buffer), input device interface 1006, output device interface 1008, sensor(s) 1010, ROM 1012, processing unit(s) 1014, network interface 1016, bus 1018, and/or subsets and variations thereof.

The bus 1018 collectively represents all system, peripheral, and chipset buses that communicatively connect the numerous internal devices and/or components of the electronic system 1000, such as any of the components of the vehicle 100 discussed above with respect to FIG. 2. In one or more implementations, the bus 1018 communicatively connects the one or more processing unit(s) 1014 with the ROM 1012, the system memory 1004, and the persistent storage device 1002. From these various memory units, the one or more processing unit(s) 1014 retrieves instructions to execute and data to process in order to execute the processes of the subject disclosure. The one or more processing unit(s) 1014 can be a single processor or a multi-core processor in different implementations. In one or more implementations, one or more of the processing unit(s) 1014 may be included on an ECU 204, such as in the form of the processor 206.

The ROM 1012 stores static data and instructions that are needed by the one or more processing unit(s) 1014 and other modules of the electronic system 1000. The persistent storage device 1002, on the other hand, may be a read-and-write memory device. The persistent storage device 1002 may be a non-volatile memory unit that stores instructions and data even when the electronic system 1000 is off. In one or more implementations, a mass-storage device (such as a magnetic or optical disk and its corresponding disk drive) may be used as the persistent storage device 1002.

In one or more implementations, a removable storage device (such as a floppy disk, flash drive, and its corresponding disk drive) may be used as the persistent storage device 1002. Like the persistent storage device 1002, the system memory 1004 may be a read-and-write memory device. However, unlike the persistent storage device 1002, the system memory 1004 may be a volatile read-and-write memory, such as RAM. The system memory 1004 may store any of the instructions and data that one or more processing unit(s) 1014 may need at runtime. In one or more implementations, the processes of the subject disclosure are stored in the system memory 1004, the persistent storage device 1002, and/or the ROM 1012. From these various memory units, the one or more processing unit(s) 1014 retrieves instructions to execute and data to process in order to execute the processes of one or more implementations.

The persistent storage device 1002 and/or the system memory 1004 may include one or more machine learning models. Machine learning models, such as those described herein, are often used to form predictions, solve problems, recognize objects in image data, and the like. For example, machine learning models described herein may be used to predict whether an authorized user is approaching a vehicle and intends to open a charging port closure. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 1018 also connects to the input device interfaces 1006 and output device interfaces 1008. The input device interface 1006 enables a user to communicate information and select commands to the electronic system 1000. Input devices that may be used with the input device interface 1006 may include, for example, alphanumeric keyboards, touch screens, and pointing devices. The output device interface 1008 may enable the electronic system 1000 to communicate information to users. For example, the output device interface 1008 may provide the display of images generated by electronic system 1000. Output devices that may be used with the output device interface 1008 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 1018 also connects to sensor(s) 1010. The sensor(s) 1010 may include a location sensor, which may be used in determining device position based on positioning technology. For example, the location sensor may provide for one or more of GNSS positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 1010 may be utilized to detect movement, travel, and orientation of the electronic system 1000. For example, the sensor(s) may include an accelerometer, a rate gyroscope, and/or other motion-based sensor(s). The sensor(s) 1010 may include one or more biometric sensors and/or image sensors for authenticating a user.

The bus 1018 also couples the electronic system 1000 to one or more networks and/or to one or more network nodes through the one or more network interface(s) 1016. In this manner, the electronic system 1000 can be a part of a network of computers (such as a local area network or a wide area network). Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

The following application is hereby incorporated by reference in its entirety, as if fully set forth herein: U.S. application Ser. No. 18/089,675.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like can be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes can be performed in different order. Some of the steps, operations, or processes can be performed simultaneously. The accompanying method claims, if any, present elements of the various steps, operations or processes in a sample order, and are not meant to be limited to the specific order or hierarchy presented. These can be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein can be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein can be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks can be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method for managing an HVAC system of a vehicle, the method comprising:
   obtaining, by a processor, sensor data from at least one sensor of the vehicle, the sensor data indicating a thermal condition, a humidity condition, and a light condition at a windshield of the vehicle;
   calculating, based on the sensor data, a fog factor indicating a severity of windshield fog formation;
   determining, based on the sensor data, a respective target evaporator temperature from within a continuous range of available evaporator temperatures that are between a minimum target temperature and a maximum target temperature; and
   achieving the respective target evaporator temperature at the HVAC system of the vehicle by transmitting, using control circuitry, a respective control signal to the HVAC system, wherein:
      if the fog factor is above a maximum threshold, the respective target evaporator temperature is the maximum target temperature and the respective control signal is a first control signal;
      if the fog factor is below a minimum threshold, the respective target evaporator temperature is the minimum target temperature and the respective control signal is a second control signal; and
      if the fog factor is between the minimum threshold and the maximum threshold, the respective target evaporator temperature is an intermediate target temperature and the respective control signal is a third control signal.

2. The method of claim 1, wherein determining the respective target evaporator temperature comprises applying the fog factor to a formula for calculating the respective target evaporator temperature, the formula positively correlating the respective target evaporator temperature with the fog factor.

3. The method of claim 1, wherein determining the respective target evaporator temperature comprises comparing the fog factor to a lookup table correlating the fog factor to the respective target evaporator temperature.

4. The method of claim 1, wherein the sensor data further indicates an operating condition of the HVAC system.

5. A method for managing an HVAC system of a vehicle, the method comprising:
   obtaining, by a processor, sensor data from multiple sensors of the vehicle, the sensor data indicating a thermal condition, a humidity condition, and a light condition at a windshield of the vehicle;
   calculating, based on the sensor data, a fog factor indicating a severity of windshield fog formation;
   if the fog factor is above a maximum threshold, achieving a maximum target temperature at an evaporator of the HVAC system of the vehicle by transmitting, using control circuitry, a first control signal to the HVAC system;
   if the fog factor is below a minimum threshold, achieving a minimum target temperature at the evaporator by transmitting, using the control circuitry, a second control signal to the HVAC system; and
   if the fog factor is between the minimum threshold and the maximum threshold, achieving an intermediate target temperature at the evaporator of the vehicle by transmitting, using the control circuitry, a third control signal to the HVAC system.

6. The method of claim 5, wherein the intermediate target temperature is within a continuous range of available evaporator temperatures that are between the minimum target temperature and the maximum target temperature.

7. The method of claim 5, further comprising applying the fog factor to a formula for calculating a target evaporator temperature, the formula positively correlating a respective target evaporator temperature with the fog factor.

8. The method of claim 5, further comprising comparing the fog factor to a lookup table correlating the fog factor to a target evaporator temperature.

9. The method of claim 5, wherein the sensor data further comprises a configuration of a door opening.

10. The method of claim 5, wherein the sensor data further indicates an operating condition of the HVAC system.

11. The method of claim 5, wherein calculating the fog factor comprises:
   determining a relative humidity corresponding to the windshield;
   determining a temperature corresponding to the windshield;
   determining a solar flux corresponding to the windshield; and
   determining a blower duty cycle.

12. A control system for a vehicle, the control system comprising:
   circuitry configured to:
      obtain sensor data from at least one sensor of the vehicle, the sensor data indicating a condition at a windshield of the vehicle;
      calculate, based on the sensor data, a fog factor indicating a severity of windshield fog formation;
      if the fog factor is above a maximum threshold, achieve a maximum target evaporator temperature at an evaporator of an HVAC system of the vehicle by transmitting, using control circuitry, a first control signal to the HVAC system;
      if the fog factor is below a minimum threshold, achieve a minimum target temperature at the evaporator by transmitting, using the control circuitry, a second control signal to the HVAC system; and
      if the fog factor is between the minimum threshold and the maximum threshold, achieve an intermediate target temperature at the evaporator of the vehicle by transmitting, using the control circuitry, a third control signal to the HVAC system.

13. The control system of claim 12, wherein the circuitry is configured to determine a respective target evaporator temperature by applying the fog factor to a formula for calculating the respective target evaporator temperature, the formula positively correlating the respective target evaporator temperature with the fog factor.

14. The control system of claim 12, wherein the circuitry is configured to determine a respective target evaporator temperature by comparing the fog factor to a lookup table correlating the fog factor to the respective target evaporator temperature.

15. The control system of claim 12, wherein the condition at the windshield of the vehicle comprises a thermal condition, a humidity condition, and a light condition at the windshield of the vehicle.

16. The control system of claim 12, wherein the sensor data further indicates an operating condition of the HVAC system.

17. The control system of claim 12, wherein the circuitry is configured to calculate the fog factor by:
   determining a relative humidity corresponding to the windshield;
   determining a temperature corresponding to the windshield;
   determining a solar flux corresponding to the windshield; and
   determining a blower duty cycle.

\* \* \* \* \*